July 24, 1962 H. M. SIERRA 3,045,914
ARITHMETIC CIRCUIT
Filed Feb. 14, 1958
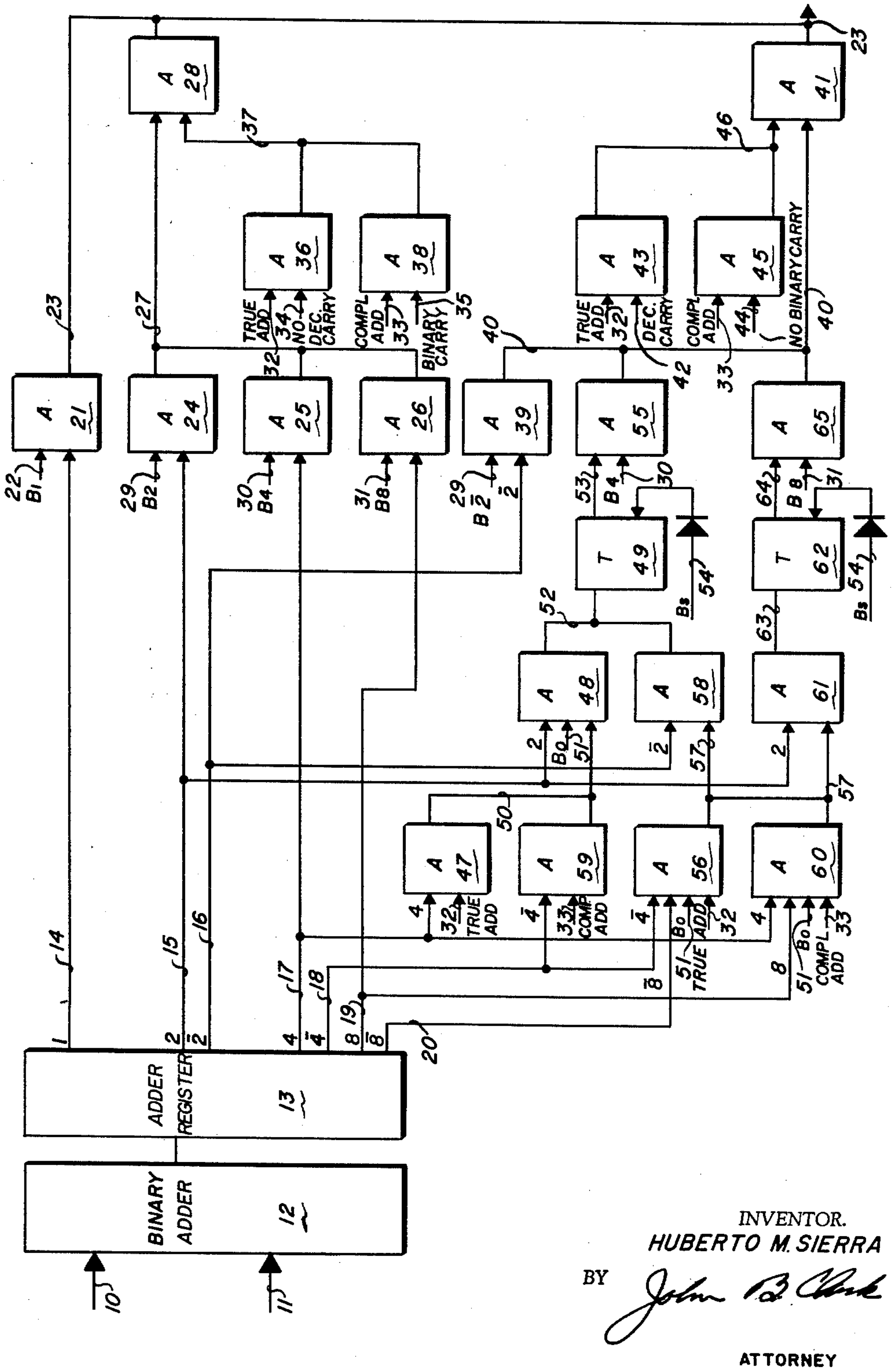
INVENTOR.
HUBERTO M. SIERRA
BY John B. Clark
ATTORNEY United States Patent Office 3,045,914

Patented July 24, 1962

3,045,914

ARITHMETIC CIRCUIT

Huberto M. Sierra, San Jose, Calif., assignor to International Business Machines Corporation, New York, N.Y., a corporation of New York Filed Feb. 14, 1958, Ser. No. 715,282
5 Claims. (Cl. 235—170)

The present invention pertains generally to arithmetic circuitry and relates more particularly to circuits for interpreting the results of binary coded decimal additions and subtractions.

In various binary coded decimal systems decimal digits are represented by four binary signals termed "bits," which bits, reading from right to left, correspond to the values $2^0$, $2^1$, $2^2$ and $2^3$ for representing the decimal digits 1, 2, 4 and 8, respectively. For example, the binary number 1001 represents a decimal digit 9 which is determined by the addition of decimal digits 1 and 8 indicated by the binary 1's in the extreme right and left binary positions, respectively.

When utilizing the 8, 4, 2, 1 code, simple binary addition methods may be used; however since it is desired to maintain the sum in binary coded decimal form, problems arise which are not encountered in a pure binary system. Under certain conditions it is necessary to alter the sum according to the result. According to the prior art, correction factors are added to the sum under certain predetermined conditions for converting the binary sum to binary coded decimal form.

The present invention is directed to structure for converting the binary sum of two binary coded decimal numbers into binary coded decimal form and is adapted for use with a serial-by-bit, serial-by-character binary adding system. In accordance with the present invention, the sum taken from a binary adder is entered into a suitable matrix which is controlled to generate signals corresponding to the corrected form of the sum. Thus, instead of adding correction factors to the binary sum taken from the adder in the manner taught by the prior art, the present invention discloses a means for converting this sum directly to the correct form thereof without the necessity of adding correction factors thereto.

Thus, an object of this invention is to provide an improved device for adding binary coded decimal digits.

Another object is to provide an improved means for correcting the result obtained by the summation of two binary coded decimal digits in a binary adder.

A further object is to provide a matrix for correcting the results of the addition of two binary coded decimal digits in a binary adder by the use of a matrix controlled according to the results.

Still a further object is to provide a device for converting the sum of two binary coded decimal digits into binary coded decimal form without the necessity of adding correction factors thereto.

Another object is to provide circuits for analyzing the sum of two serial-by-bit binary coded decimal digits and for gating signals through a matrix under control of the results of the analysis for generating a train of signals at the output of the matrix representative of the binary coded decimal form of the sum.

Other objects of the invention will be pointed out in the following description and claims and illustrated in the accompanying drawing which discloses, by way of example, the principle of the invention and the best mode which has been contemplated of applying that principle.

The single figure of the drawing, FIG. 1, is a schematic block diagram of the disclosed embodiment of the invention.

As shown and described, the present invention is adapted for use in connection with an adder arrangement such as is shown in the application for U.S. Letters Patent Serial No. 656,785, filed May 3, 1957 although, as will become clear to those familiar with the art, the invention may be readily adapted for use in connection with other adding systems.

Before proceeding with the description of the circuitry of the invention, it will be well to understand that this circuitry is described as being used in connection with apparatus utilizing an eight-bit code, i.e., $B_s$, $B_0$, $B_x$, $B_1$, $B_2$, $B_4$, $B_8$ and $B_r$ wherein $B_s$ is a so-called "space" bit provided between adjacent characters, $B_r$ is a redundancy bit, $B_0$ and $B_x$ are the so-called "alphabetic zone" bits and $B_1$, $B_2$, $B_4$, $B_8$ are the numerical bits. Additionally, it should be understood that the novel circuitry disclosed herein is arranged to convert results of binary addition on both true add and complement add operations to binary coded decimal form. In this connection the result of a true add operation is in binary coded decimal form unless the sum exceeds 9, in which case means (not shown) are provided for indicating a decimal carry. Thus, when no decimal carry is indicated on a true add operation, the results are already in correct form and no conversion is necessary, a conversion being necessary on true add operations only when a decimal carry is indicated.

Subtraction is accomplished by complement addition and in the present embodiment the minuend is entered into the adder in true form, the subtrahend being entered in 15's complement form. Additionally, a "1" is entered into the adder during $B_1$ time of the low order digit of the minuend and subtrahend to convert the subtrahend to 16's complement form. Thus, the result taken from the adder is equal to the binary sum of the minuend and the 16's complement of the subtrahend. Since it is desired to maintain negative results in 10's complement form, it is necessary to convert them to this form.

On a complement add operation the result is negative only if no binary carry results, i.e., if there is no carry during $B_8$ time. Conversely, when there is a binary carry on complement add, the result is a positive number. Thus, when no binary carry results on a complement add operation, the result is negative and it is necessary to convert it to 10's complement form. When there is a binary carry on complement add, the result is positive and, since the minuend+(16−subtrahend)−16=minuend−subtrahend, the result is already in correct form provided that the binary carry is ignored. Thus, on complement add when there is a binary carry, the carry is ignored and no conversion of the result is necessary.

The following charts indicate the various possible results that may be taken from the adder together with the corresponding desired results in each of the true add-no decimal carry, true add-decimal carry, complement add-no binary carry and complement add-binary carry conditions.

*True Add*

| Adder Result $B_8$ $B_4$ $B_2$ $B_1$ | Decimal Carry | Decimal Equivalent | Desired Result $B_8$ $B_4$ $B_2$ $B_1$ | Decimal Equivalent |
|---|---|---|---|---|
| 0 0 0 0 | No | 0 | 0 0 0 0 | 0 |
| 0 0 0 1 | No | 1 | 0 0 0 1 | 1 |
| 0 0 1 0 | No | 2 | 0 0 1 0 | 2 |
| 0 0 1 1 | No | 3 | 0 0 1 1 | 3 |
| 0 1 0 0 | No | 4 | 0 1 0 0 | 4 |
| 0 1 0 1 | No | 5 | 0 1 0 1 | 5 |
| 0 1 1 0 | No | 6 | 0 1 1 0 | 6 |
| 0 1 1 1 | No | 7 | 0 1 1 1 | 7 |
| 1 0 0 0 | No | 8 | 1 0 0 0 | 8 |
| 1 0 0 1 | No | 9 | 1 0 0 1 | 9 |
| 1 0 1 0 | Yes | 10 | 0 0 0 0 | 0 |
| 1 0 1 1 | Yes | 11 | 0 0 0 1 | 1 |
| 1 1 0 0 | Yes | 12 | 0 0 1 0 | 2 |
| 1 1 0 1 | Yes | 13 | 0 0 1 1 | 3 |
| 1 1 1 0 | Yes | 14 | 0 1 0 0 | 4 |
| 1 1 1 1 | Yes | 15 | 0 1 0 1 | 5 |
| 0 0 0 0 | Yes | 16 | 0 1 1 0 | 6 |
| 0 0 0 1 | Yes | 17 | 0 1 1 1 | 7 |
| 0 0 1 0 | Yes | 18 | 1 0 0 0 | 8 |
| 0 0 1 1 | Yes | 19 | 1 0 0 1 | 9 |

*Complement Add*

| Adder Result $B_8\,B_4\,B_2\,B_1$ | Binary Carry | Decimal Equivalent | Desired Result $B_8\,B_4\,B_2\,B_1$ | Decimal Equivalent |
|---|---|---|---|---|
| 0 0 0 0 | Yes | 0 | 0 0 0 0 | 0 |
| 0 0 0 1 | Yes | 1 | 0 0 0 1 | 1 |
| 0 0 1 0 | Yes | 2 | 0 0 1 0 | 2 |
| 0 0 1 1 | Yes | 3 | 0 0 1 1 | 3 |
| 0 1 0 0 | Yes | 4 | 0 1 0 0 | 4 |
| 0 1 0 1 | Yes | 5 | 0 1 0 1 | 5 |
| 0 1 1 0 | Yes | 6 | 0 1 1 0 | 6 |
| 0 1 1 1 | Yes | 7 | 0 1 1 1 | 7 |
| 1 0 0 0 | Yes | 8 | 1 0 0 0 | 8 |
| 1 0 0 1 | Yes | 9 | 1 0 0 1 | 9 |
| 0 1 1 0 | No | −6 | 0 0 0 0 | 0 |
| 0 1 1 1 | No | −7 | 0 0 0 1 | −9 |
| 1 0 0 0 | No | −8 | 0 0 1 0 | −8 |
| 1 0 0 1 | No | −9 | 0 0 1 1 | −7 |
| 1 0 1 0 | No | −10 | 0 1 0 0 | −6 |
| 1 0 1 1 | No | −11 | 0 1 0 1 | −5 |
| 1 1 0 0 | No | −12 | 0 1 1 0 | −4 |
| 1 1 0 1 | No | −13 | 0 1 1 1 | −3 |
| 1 1 1 0 | No | −14 | 1 0 0 0 | −2 |
| 1 1 1 1 | No | −15 | 1 0 0 1 | −1 |

It is from these charts that the logic for the conversion matrix of the disclosed embodiment of the invention is derived. Referring to the charts it can be seen that: (1) $B_1$ taken from the adder is always the same as $B_1$ of the desired result. (This is true on both true add and complement add operations whether or not there is a decimal or a binary carry.) (2) On true add with no decimal carry or on complement add with a binary carry $B_2$, $B_4$ and $B_8$ taken from the adder are always the same as $B_2$, $B_4$ and $B_8$, respectively, of the desired result. (3) On true add with decimal carry or on complement add with no binary carry, $B_2$ taken from the adder is always opposite from $B_2$ of the desired result. (4) On true add with a decimal carry or on complement add with no binary carry, the desired result contains a "4" bit if the adder result contains (*a*) both a "2" bit and a "4" bit on true add, (*b*) no "2" bit, no. "4" bit and no "8" bit on true add, (*c*) a "2" bit and no "4" bit on complement add, or (*d*) no "2" bit, a "4" bit and an "8" bit on complement add. (5) On true add with a decimal carry or on complement add with no binary carry, the desired result contains an "8" bit if the adder result contains (*a*) a "2" bit and no "4" bit and no "8" bit on true add, or (*b*) a "2" bit, a "4" bit and an "8" bit on complement add.

Referring now to the drawing, binary coded decimal numbers are entered via lines 10 and 11 into a binary adder 12, shown in block form, the sum being entered after a short delay into a register 13 which is arranged to store the results of the addition for one character time. Seven lines 14 through 20 connect to the output of the adder register for indicating the sum stored therein according to the condition of these lines. Thus, if the sum contains a "1" bit, the line 14 is high. Similarly, if the sum contains a "2" bit, a "4" bit or an "8" bit, the line 15, 17 or 19, respectively, is high. Also, if the sum does not contain a "2" bit, a "4" bit or an "8" bit, the line 16, 18 or 20, respectively, is high. Thus, for example, when the sum is equal to 7 (0111) the lines 14, 15, 17 and 20 are high.

It will be recalled that on either true add or complement add operations, whether or not there is a binary or a decimal carry, $B_1$ taken from the adder is always the same as $B_1$ in the desired result. For this reason the line 14 connects to one input of an AND unit 21, the second input of which connects to a line 22 upon which a signal appears during each $B_1$ time. Thus, a $B_1$ pulse is gated by the unit 21 onto a line 23, the output line, according to the result taken from the adder 12.

On true add when there is no decimal carry or on complement add when there is a binary carry, $B_2$, $B_4$ and $B_8$ taken from the adder are always the same as $B_2$, $B_4$ and $B_8$, respectively, of the desired result. In these cases no corrections are necessary. Accordingly, the lines 15, 17 and 19 connect to one input of each of three AND units 24, 25 and 26, respectively, the outputs of these units being connected via a line 27, referred to hereinafter as the first result line, to one input of another AND unit 28. $B_2$ signals are connected via a line 29 to the second input of the AND unit 24. Similarly, $B_4$ and $B_8$ signals connect via lines 30 and 31, respectively, to the second input of the AND units 25 and 26, respectively. Thus, signals taken from the lines 15, 17 and 19 are mixed in the units 24, 25 and 26, respectively, with $B_2$, $B_4$ and $B_8$ signals, respectively. In this way the sum as stored in the adder register is entered onto the first result line 27.

Signals taken from the first result line 27 are entered on the output line 23 either on true add when there is no decimal carry or on complement add when there is a binary carry. For this reason the signals taken from the line 27 are mixed in the AND unit 28 with a signal referred to as the true add-no decimal carry, complement add-binary carry signal.

On true add operations means are provided for raising the potential of a line 32, while on complement add operations a line 33 is controlled to go up. Similarly, means are arranged to raise the potential of a line 34 when there is no decimal carry, to raise the potential of a line 35 when there is a binary carry, to raise the potential of a line 42 when there is a decimal carry and to raise the potential of a line 44 when there is no binary carry. As will be obvious to those skilled in the art, these signals may be generated in any convenient manner, one method being disclosed in the aforementioned patent application. Since the circuits for generating these signals form no part of the present invention, a further discussion of their derivation is deemed unnecessary.

The true-add and no-decimal-carry lines 32 and 34, respectively, connect to the two inputs of an AND unit 36, the output of which connects via a line 37 to the second input of the AND unit 28. Similarly, the complement-add and binary-carry lines 33 and 35, respectively, connect to the two inputs of an AND unit 38, the output of which also connects via the line 37 to the second input of the AND unit 28. Thus, on either the true add-no decimal carry or complement add-binary carry conditions the signals taken from the first result line 27 are gated through the AND unit 28 to the output line 23, as is desired.

On true add when there is a decimal carry or on complement add when there is no binary carry, it is necessary to correct the result taken from the adder prior to entering it on the output line 23. It will be recalled that under these conditions $B_2$ taken from the adder is always opposite to $B_2$ of the desired result, and for this reason the $\bar{2}$ line 16 connects to one input of an AND unit 39. The second input of the unit 39 connects to the $B_2$ line 29, and a line 40, the second result line, connected to the output of the unit 39 is controlled to rise during $B_2$ time if the line 16 is high, i.e., if the sum stored in the register 13 contains no "2" bit. As will become clear, signals taken from the second result line 40 are entered onto the output line 23 either on true add when there is a decimal carry or on complement add when there is no binary carry.

The line 40 connects to one input of an AND unit 41, the second input of which is controlled to rise on either the true add-decimal carry or complement add-no binary carry conditions. This is true since the true-add line 32 and the decimal-carry line 42 connect to the two inputs of an AND unit 43 and since the complement-add line 33 and the no-binary-carry line 44 connect to the two inputs of an AND unit 45. The outputs taken from the units 43 and 44 connect via a line 46 to the second input of the unit 41. Thus, either on the true add-decimal carry or on the complement add-no binary carry conditions the line 46 is high and signals entered onto the second result line 40 pass through the unit 41 to the output line 23.

As was also noted above, on true add when there is a decimal carry the desired result contains a "4" bit if the adder result contains both a "2" bit and a "4" bit. These conditions are analyzed in two AND units 47 and 48 and, if met, a trigger 49 is operated. The 4 line 17 connects to one input of the unit 47, the true-add line 32 being connected to the second input thereof. Thus, on true add when there is a "4" bit in the register 13, a line 50 connected to the output of the unit 47 rises. This line connects to one input of the unit 48, a second input of which connects to the 2 line 15. A third input to the unit 48 connects to a line 51 to which $B_0$ signals are applied. Thus, on a true add operation if the sum contains both a "4" bit and a "2" bit, a line 52 connected to the output of the unit 48 rises during $B_0$ time. This signal is arranged to operate the trigger 49 for raising the potential of a line 53 connected to the output thereof. Trigger 49 is reset at the beginning of each character time by $B_s$ signals which are applied thereto via a line 54.

If the trigger 49 is operated, the line 53 is high and $B_4$ pulses taken from the line 30 are gated through an AND unit 55 to the second result line 40 since the lines 30 and 53 connect to the two inputs of the unit 55. Since signals entered on the line 40 pass through the unit 41 to the output line 23 only on true add-decimal carry or complement add-no binary carry conditions, a "4" bit is entered on the line 23 via this circuitry on true add when there is a decimal carry if the sum contains both a "4" bit and a "2" bit.

It is also desired to enter a "4" bit onto the output line 23 on a true add-decimal carry condition if the adder result contains no "2" bit, no "4" bit and no "8" bit. Accordingly, the $\bar{4}$ and $\bar{8}$ lines 18 and 20, respectively, connect to two inputs of an AND unit 56, the true-add line 32 and $B_0$ line 51 being connected to the other two inputs of this unit. On true add, therefore, when there is no "4" bit and no "8" bit present in the result stored in the adder register, a $B_0$ pulse passes through the unit 56 to a line 57. This line connects to one input of an AND unit 58, the second input of which connects to the $\bar{2}$ line 16. The line 52 connects to the output of the unit 48 for operating trigger 49 when both inputs to the unit 58 are high. Thus, on true add when there is no "2" bit, no "4" bit and no "8" bit present in the adder register, the trigger 49 is operated for gating $B_4$ signals through the unit 55 to the second result line 40. If there is a decimal carry, these signals are then gated through the unit 41 to the output line 23.

It is also desired to enter a "4" bit into the result entered on the line 23 on complement add-no binary carry situations when there is a "2" bit but no "4" bit present in the adder register. For this reason the complement-add line 33 and the $\bar{4}$ line 18 connect to the two inputs of an AND unit 59, the output of which connects to the line 50. Thus, on complement add when there is a "2" bit but no "4" bit present in the sum stored in the adder register, the trigger 49 is operated for controlling the entry of a "4" bit onto the second result line 40. Further if there has been no binary carry, this signal is entered onto the output line 23.

It will also be recalled that a "4" bit is entered onto the line 23 on complement add operations when there is no binary carry if the sum taken from the adder contains no "2" bit but does contain both a "4" bit and an "8" bit. An AND unit 60 is provided for determining the presence of both "4" and "8" bits on complement add operations since the 4 and 8 lines 17 and 19, respectively, connect to two inputs of the unit 60 and since the complement-add line 33 connects to a third input of this unit. The $B_0$ line 51 connects to the fourth input of the unit 60, the output of which connects to the line 57. When there is no "2" bit stored in the register 13 and the line 57 goes up, trigger 49 is operated, as discussed above. Thus, on complement add when the sum contains no "2" bit but does contain both a "4" and an "8" bit, a "4" bit is entered onto the line 40, and if there has been no binary carry, this signal is entered onto the output line 23.

On true add when there is a decimal carry, the desired result contains an "8" bit if the sum stored in the adder register contains a "2" bit but no "4" bit and no "8" bit. It will be recalled that the line 57 goes up on true add operations during $B_0$ time when the lines 18 and 20 are high, which lines are high when there is no "4" bit and no "8" bit stored in the register 13. The line 57 connects to one input of an AND unit 61, the second input of which connects to the 2 line 15. The output of the unit 61 connects to a trigger 62 via a line 63 for operating this trigger when the line 63 rises. The trigger 62, like the trigger 49, is reset by $B_s$ signals applied via the line 54 thereto. Thus on true add when the sum stored in the adder register 13 contains a "2" bit but does not contain either a "4" bit or an "8" bit, the trigger 62 is operated to raise the potential of a line 64 connected to the output thereof. The line 64 connects to one input of an AND unit 65, the second input of which is connected to the $B_8$ line 31. On true add, therefore, if there is a "2" bit but no "4" bit and no "8" bit in the adder result, $B_8$ pulses are gated through the unit 65 to the second result line 40, these signals being gated onto the line 23 if there is a decimal carry indicated.

It is also desired to enter an "8" bit into the desired result on complement add operations when there is no binary carry if the sum stored in the adder register 13 contains a "2" bit, a "4" bit and an "8" bit. It will be recalled that the line 57 connected to the output of the AND unit 60 also goes up during $B_0$ time if there is a "4" bit and an "8" bit present in the adder register during a complement add operation. Thus, the line 63 rises during $B_0$ time on complement add for operating the trigger 62 when the sum stored in the adder register contains a "2" bit, a "4" bit and an "8" bit, thereby permitting the passage of $B_8$ pulses through the unit 65 to the line 40. If there is no binary carry, the line 46 is high and these $B_8$ pulses are entered onto the output line 23 through the unit 41.

Thus, all "1" bits taken from the adder register are entered directly onto the output line 23 since these signals are in the desired form and need no correction thereto. On true add-no decimal carry or complement add-binary carry conditions, "2," "4" and "8" bits are gated from the first result line 27 through the AND unit 28 to the output line 23 directly since no conversion is necessary under these conditions. On true add-decimal carry or complement add-no binary carry conditions, the adder result is converted according to the condition of the $\bar{2}$ line 16 and the triggers 49 and 62 for entering the desired result through the AND unit 41 onto the output line 23.

It should now be understood that the results of the binary addition of the two binary coded decimal numbers entered into the adder 12 via the lines 10 and 11 are entered onto the line 23 during the next following character time in correct binary coded decimal form without the necessity of adding corrections thereto. The binary sum entered into the adder register 13 is analyzed according to the existing conditions and is converted by means of the described matrix directly into the form desired, i.e., it is converted directly to the proper binary coded decimal form thereof. Although the disclosed embodiment of the invention has been described in connection with the more conventional binary coded decimal form, it will be understood that the invention should not be limited to this extent since it is obvious that the teaching of the invention may be readily extended to other such codes. Additionally, the invention should not be limited for use in connection with an adder which utilizes the 16's complement for accomplishing complement add operations since various simple modifications will be readily apparent to those skilled in the art for rendering the circuitry of the invention adaptable to other forms of complement add devices.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A circuit for converting the results of a serial by bit binary addition of two serial by bit binary coded decimal digits into binary coded decimal form comprising an input circuit and an output circuit, said input circuit including a multistage register for simultaneously indicating the various orders of the binary sum of two binary coded decimal digits, a first result line a plurality of, first gating means selectively controlled by the condition of the various orders of said register for serially gating signals onto said first result line representative of the sum indicated by said register, a second result line a plurality of, second gating means selectively controlled by the condition of the various orders of said register for serially gating signals onto said second result line representative of the sum indicated by said register minus 10, said first and second gating means being operable for gating said signals onto said first and second result lines simultaneously, means controlled by a "no carry" signal generated in response to a sum stored in said register representative of a decimal digit less than 10 for gating said signals taken from said first result line to said output circuit, and means controlled by a "carry" signal generated in response to a sum stored in said register representative of a decimal digit in excess of 9 for gating said signals from said second result line to said output circuit, whereby signals entered on said first or second result line are gated therefrom to said output circuit under control of said "carry" and "no carry" signals.

2. A circuit for converting the result of a binary addition of a first binary coded decimal digit and the 16's complement of a second binary coded decimal digit into binary coded decimal form, comprising an input circuit and an output circuit, said input circuit including a multistage register for simultaneously indicating the various orders of the binary sum of said first digit and the 16's complement of said second digit, a first result line a plurality of, first gating means controlled by said register for gating signals onto said first result line representative of the sum indicated by said register, a second result line a plurality of, second gating means controlled by said register for gating signals onto said second result line representative of the sum indicated by said register minus 6, said first and second gating means being operable simultaneously for gating said signals representative of said sum indicated by said register and said sum indicated by said register minus 6 into said first and second result lines, respectively, means controlled by a "carry" signal generated in response to a sum stored in said register representative of a decimal number in excess of 15 for gating said signal taken from said first result line into said output circuit, and means controlled by a "no carry" signal generated in response to a sum stored in said register representative of a decimal number less than 16 for gating said signal taken from said second result line into said output circuit.

3. A circuit for converting the result of a binary addition into binary coded decimal form comprising a register for simultaneously indicating the various orders of said result, a first result line, means for entering signals corresponding to the sum indicated by said register onto said first result line, a second result line, means responsive to a signal representative of a true add condition for entering signals corresponding to said indicated sum minus 10 on said second result line, means responsive to a signal representative of a complement add condition for entering signals corresponding to said indicated sum minus 6 on said second result line, an output circuit, means for gating signals from said first result line to said output circuit in response to a "no conversion" signal representative of a true add condition when said indicated sum is less than 10 or a complement add condition when said indicated sum is greater than 15, and means for gating signals from said second result line to said output circuit in response to a "conversion" signal representative of a true add condition when said indicated sum is greater than 9 or a complement add condition when said indicated sum is less than 16.

4. A circuit for converting the result of the binary addition of two binary coded decimal digits into binary coded decimal form wherein both of said digits are represented in true form on a true add operation and one of said digits is represented in 16's complement form on a complement add operation, comprising an input circuit and an output circuit, said input circuit including a register for simultaneously indicating the various orders of the binary sum of said two digits, a first result line, a first gating means controlled by said register for gating signals onto said first result line according to the sum indicated by said register, a second result line, a second gating means controlled by said register on a true add operation for gating signals onto said second result line according to the sum indicated by said register minus 10, said second gating means being additionally controlled by said register on a complement add operation for gating signals onto said second result line according to the sum indicated by said register minus 6, third gating means controlled by a signal representative of a true add operation and by a "no decimal carry" signal generated in response to a sum representative of a number less than 10 for gating signals taken from said first result line into said output circuit, said third gating means being additionally controlled by a signal representative of a complement add operation and by a "binary carry" signal generated in response to a sum representative of a number in excess of 15 for gating said signals from said first result line into said output circuit, and a fourth gating means controlled by a signal representative of a true add operation and by a "decimal carry" signal generated in response to a sum in excess of 9 for gating signals taken from said second result line into said output circuit, said fourth gating means being additionally controlled by a signal representative of a complement add operation and by a "no binary carry" signal generated in response to a sum less than 16 for gating signals taken from said second result line into said output circuit.

5. A circuit for converting the result of the binary addition of two digits into 8, 4, 2, 1 binary coded decimal form wherein true add is accomplished by the binary addition of the actual 8, 4, 2, 1 binary coded decimal forms of the digits and complement add is accomplished by adding the actual 8, 4, 2, 1 binary coded decimal form of one digit to the 8, 4, 2, 1 binary coded form of the 16's complement of the other digit, comprising a register for simultaneously indicating the four orders of the binary sum of said digits, an output circuit, means responsive to the presence of a bit in the 1's order of the sum indicated by said register for entering a signal into said output circuit representative of a "1" bit, a result line, means responsive to the absence of a bit in the 2's order of said indicated sum for entering a signal representative of a "2" bit onto said result line, means responsive to a signal representative of a true add condition and to the presence of a bit in each of the 2's order and 4's order of said indicated sum for entering a signal representative of a "4" bit on said result line, means responsive to a signal representative of a complement add condition, to the presence of a bit in the 2's order of said indicated sum and to the absence of a bit in the 4's order of said indicated sum for entering a signal representative of a "4" bit on said result line, means responsive to said true add signal and to the absence of bits in the 2's order, 4's order and 8's order of said indicated sum for entering a signal representative of a "4" bit on said result line, means responsive to said complement add signal, to the presence of bits in the 4's order and 8's order of said indicated sum and to the absence of a bit in the 2's order of said indicated sum for entering a signal representative of a "4" bit on said result line, means responsive to said true add signal, to the presence of a bit in the 2's order of said indicated sum and to the absence of bits in the 4's order and 8's order of said indicated sum for entering a signal representative of an "8" bit on said result line, means responsive to said complement add signal and to the presence of bits in the 2's order, 4's order and 8's order of said indicated sum for entering a signal representative of an "8" bit on said result line, and means responsive to said true add signal and to a "decimal carry" signal representative of an indicated sum in excess of 9 for entering signals taken from said result line into said output circuit, said means being additionally responsive to said complement add signal and to a "no binary carry" signal representative of an indicated sum less than 16 for entering said signals taken from said result line into said output circuit.

References Cited in the file of this patent

UNITED STATES PATENTS 2,823,855 Nelson ---------------- Feb. 18, 1958

FOREIGN PATENTS 738,605 Great Britain ---------- Oct. 19, 1955

OTHER REFERENCES

The Staff of the Computation Laboratory, Synthesis of Electronic Computing and Control Circuits (May 1951), Harvard University Press, Cambridge, Mass. Pages 184 to 186 of interest.

Wilkes: Automatic Digital Computers (1956), John Wiley and Sons, N.Y. Pages 242 to 250 of interest.

UNITED STATES PATENT OFFICE

CERTIFICATE OF CORRECTION

Patent No. 3,045,914 July 24, 1962

Huberto M. Sierra

It is hereby certified that error appears in the above numbered patent requiring correction and that the said Letters Patent should read as corrected below.

Column 3, line 38, for "no." read -- no --; column 7, lines 20, 24, 49, and 53, after "line", each occurrence, insert a comma; same column 7, lines 20, 24, 50 and 53, after "of", each occurrence, strike out the comma.

Signed and sealed this 20th day of November 1962.

(SEAL)
Attest:

ERNEST W. SWIDER
Attesting Officer

DAVID L. LADD
Commissioner of Patents